(12) United States Patent
Bharatia et al.

(10) Patent No.: US 7,136,635 B1
(45) Date of Patent: Nov. 14, 2006

(54) PROXY SIP SERVER INTERFACE FOR SESSION INITIATION COMMUNICATIONS

(75) Inventors: Jayshree Bharatia, Plano, TX (US); Marvin Bienn, Dallas, TX (US); Kuntal Chowdhury, Plano, TX (US)

(73) Assignee: Nortel Networks Limited, St. Laurant (CA)

( * ) Notice: Subject to any disclaimer, the term of this patent is extended or adjusted under 35 U.S.C. 154(b) by 625 days.

(21) Appl. No.: 10/385,352

(22) Filed: Mar. 10, 2003

Related U.S. Application Data

(60) Provisional application No. 60/363,278, filed on Mar. 11, 2002.

(51) Int. Cl.
*H04Q 7/20* (2006.01)
(52) U.S. Cl. ............ 455/422.1; 370/912; 370/913
(58) Field of Classification Search ............... 370/252, 370/352, 401, 912, 913; 455/422.1
See application file for complete search history.

(56) References Cited

U.S. PATENT DOCUMENTS

| | | | | |
|---|---|---|---|---|
| 5,711,006 | A * | 1/1998 | Brochu et al. | 455/445 |
| 6,131,026 | A * | 10/2000 | Badillo | 455/428 |
| 6,870,817 | B1 * | 3/2005 | Dolinar et al. | 370/252 |
| 7,061,903 | B1 * | 6/2006 | Higuchi | 370/352 |
| 2002/0075880 | A1 * | 6/2002 | Dolinar et al. | 370/401 |
| 2002/0105943 | A1 * | 8/2002 | Womack et al. | 370/352 |

OTHER PUBLICATIONS

"A Comparison of H.323v4 and SIP," Nortel Networks, Jan. 5, 2000.
Schulzrinne, Henning; "The Session Initiation Protocol (SIP);" Columbia University; May 2001.
Bergen, "SIP for Call Control in the "all-IP" UMTS network," Interworking, 2000.
"IP Network Architecture Model for cdma2000 Spread Spectrum Systems," 3GPP2, Dec. 9, 2002.
Durham, D (Ed); RFC: 2748 The COPS (Common Open Policy Service) Protocol, The Internet Society, Jan. 2000.
Chan, K.; D. Durham, K. McCloghrie, S. Herzog, F. Reichmeyer, R. Yavatkar, A. Smith; "RFC 3084 COPS Usage for Policy Provisioning (COPS-PR);" The Internet Society; Mar. 2001.
Garcia, M.; D. Mills, G. Bajko, G. Mayer, F. Derome, H. Shieh, A. Allen, S. Chotai, K. Drage, J. Bharatia, K. Hobbis, D. Willis; "3GPP Requirements on SIP," Network Working Group, Mar. 2002.
Narayanan, Schulzrinne, and Kundagle; Calhoun, Pat; J. Loughney, E. Guttman, G. Zorn, J. Akko; "DIAMETER Base Protocol;" The Internet Society, Dec. 2002.

(Continued)

*Primary Examiner*—Bing Q. Bui
(74) *Attorney, Agent, or Firm*—Hemingway & Hansen, LLP; D. Scott Hemingway; Malcolm W. Pipes

(57) ABSTRACT

The present invention supports a message protocol on a wireless communication network between the access gateway and the proxy session initiation server. Upon disruption of a communication session with a mobile station, an information packet indication disruption of the communication session is transmitted from the access gateway to the proxy session initiation protocol server. Upon receipt of the information packet, the proxy session initiation server initiates a resource release procedure freeing network resources supporting the communication session. The proxy session initiation server releases the resources and transmits an information packet to the serving session initiation server, which also initiates a release procedure. Answer and acknowledgement messages are also sent in response to the release request and/or the release of resources.

20 Claims, 2 Drawing Sheets

OTHER PUBLICATIONS

Peretz, Matthew; "COPS Enable Global Roaming Across Cellular and WLANs," 802.11 Planet. Oct. 9, 2001.

Cookish, Mike; "COPS lays down policy-management law;" Network World Fusion, May 10, 1999.

* cited by examiner

PROXY SIP SERVER INTERFACE FOR SESSION INITIATION COMMUNICATIONS

RELATED APPLICATION DATA

This application is related to Provisional Patent Application Ser. No. 60/363,278 filed on Mar. 11, 2002, and priority is claimed for this earlier filing under 35 U.S.C. § 120. The Provisional Patent Application is also incorporated by reference into this utility patent application.

TECHNICAL FIELD OF THE INVENTION

A message protocol for the proxy session initiation protocol (SIP) server in IP mobility systems.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device, and the TCP/IP protocol determines this routing. Because of the standard protocols in Internet communications, the IP protocol on the destination communication device decodes the transmitted information into the original information transmitted by the originating device.

TCP/IP Addressing and Routing

Under the TCP/IP protocols, a computer operating on an IP-based network is assigned a unique physical address called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through a router on the boundary of the network, and as such, these information packets will not clutter the transmission lines outside the network. If data is addressed to a computer outside the network, the router on the network boundary forwards the data onto the greater network.

TCP/IP network protocols define how routers determine the transmission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

When a mobile station is operating on a home or visited network, specialized servers authenticate, authorize, and collect accounting information for services rendered to the mobile station. This authentication, authorization, and accounting activity is called "AAA," and AAA computer servers on the home and visited network perform the AAA activities.

Authentication is the process of proving one's claimed identity, and security systems on a mobile IP network will often require authentication of the system user's identity before authorizing a requested activity. The AAA server authenticates the identity of an authorized user and authorizes the mobile station's requested activity. Additionally, the AAA server performs the accounting functions by tracking usage on the network.

Communicating information packets to an AAA server according to an AAA protocol accomplishes AAA. One such protocol is DIAMETER. DIAMETER information packets include a routing header for routing over network connections and attribute value pairs (AVPs). The AVP values designate the type of DIAMETER packet and implementing data instructions.

DIAMETER is a peer-to-peer protocol where any node in a communication system utilizing the DIAMETER protocol can initiate a message or request, which can also include server-initiated messages. A DIAMETER client is a device at the edge of the network performing access control, and the DIAMETER client generates DIAMETER messages requesting AAA services for a user. A DIAMETER agent is a node that does not perform AAA locally such as proxies, redirects, and relay agents. A DIAMETER server performs AAA for the user, and a DIAMETER node can act as either a client or an agent for certain requests.

The focus of the DIAMETER protocol is network access and accounting applications supporting mobile IP systems. However, DIAMETER is designed to be adaptable and extensible by defining new AVPs, creating new AVPs, and creating new AAA applications. DIAMETER AVP values carry specific AAA information and can be used to convey other related control and command functions on the communication system. Compared to earlier standards, DIAMETER features simplified client/user management, Network Access Identifier (NAI) based user authentication, dynamic IP address allocations for mobile stations, dynamic Home Agent allocation, and flexible accounting mechanisms.

Another emerging communication protocol for AAA is the Common Open Policy Service (COPS) query-and-response protocol. COPS is a policy and control protocol linking Policy Decision Points (PDP) and Policy Enforcement Points (PEP). Like DIAMETER, COPS is scalable, and COPS can be configured to support different policy-based services to provide general administration, configuration, and enforcement mechanisms on communication network systems. COPS can be used to support AAA and runs under TCP.

An advantage of COPS is its interoperability across all wireless communication systems, permitting wireless roaming over different communication standards (e.g. 802.11, CDMA2000, UMTS, GSM, etc). The COPS architecture creates a "protocol gateway" effectively translating data among networks using different protocols into a single, common language. Defined message types in COPS include Request, Response, Report State, Synchronize State, Client-Accept, Client-Close, and Keep-Alive.

The 3$^{rd}$ Generation Partnership Project 2 (3GPP2) is an evolving third generation communication system standard for wireless communication systems transmitting multimedia services. These 3GPP2 mobile communication systems support multimedia telecommunication services delivering voice (VoIP) and data, to include pictures, video communications, and other multimedia information over mobile wireless connections. These systems generally operate over a derivative General Packet Radio Service (GPRS) and/or Universal Mobile Telecommunication Systems (UMTS) communication system architecture.

Multimedia communications over 3GPP2 systems use Session Initiation Protocol (SIP) to setup communication paths over the system's router for transmitting information packets. SIP is the core protocol for establishing multimedia communication sessions in the Internet. The protocol transmits information packets establishing, changing, and terminating communication sessions for multimedia applications in IP-based networks. The protocol is used to register IP-based address end points; perform address resolution, name mapping and call redirection functions; determine media capabilities of the target end points; register end user preferences and call routing; register and publish presence information; establish a communication session and support mid-session changes; and support transfer and termination of calls.

Currently, there is no control interface between the access gateway and the SIP proxy server on the 3GPP2 systems featuring SIP for setting up appropriate communication interfaces on the system's routers. If service for the communication session over the wireless connection is disrupted, the access gateway receives indication of the service loss. However, since the access gateway and the SIP proxy server lack an appropriate interface, the SIP proxy server does not receive an indication of the loss in service and continues reservation of network resources that support a lost communication session with the mobile station. Without notification to and from the SIP proxy server and the serving SIP server, network resources remain allocated to the discontinued session on the communication network. Timely notification to the proxy and serving SIP server will free network resources and terminate AAA features thereby improving efficiency and usage data accuracy.

SUMMARY OF THE INVENTION

The present invention defines a communication interface between the access gateway and the SIP outbound proxy server, so the access gateway can communicate a disrupted and lost communication session and initiate release of network resources. The proxy SIP server communicates termination by the abnormal event to the serving SIP server and initiates termination of the session and release of network resources devoted to the session.

In operation, the access gateway determines communication loss to the mobile station. The access gateway then transmits a message to the proxy SIP server signifying disruption of the communication. The proxy SIP server in turn initiates a procedure releasing all network resources associated with the session and transmits a message to the serving SIP server. Both SIP servers cease supporting the lost communication and release network resources supporting the lost communication.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
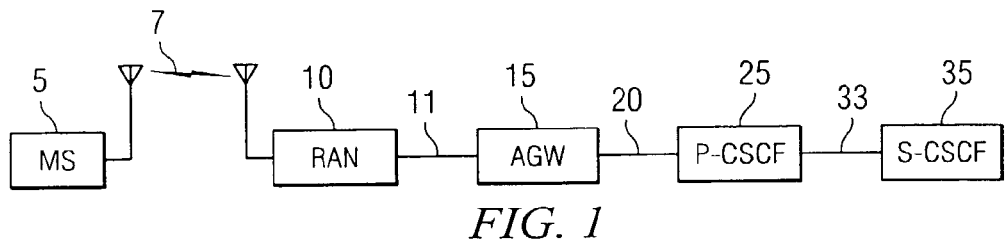
FIG. 1 is a schematic diagram of the functional elements of a 3GPP2 mobile IP communications system for IP multimedia utilizing the invention.

FIG. 1 shows the basic configuration of a 3GPP2 mobile IP communication using a SIP protocol. Mobile Station (MS) 5 is coupled to Radio Access Network (RAN) 10 by wireless communication link 7. RAN 10 supports wireless communication with MS 5, which can include cellular phones, laptop computers, pocket computers, pagers, wireless video connections, or other IP-based wireless communications devices. The RAN 10 also controls other components in the network to further support the transmission of voice and data on the communication network and over the wireless connection to the mobile station, as well as other wireless devices.

The RAN 10 is coupled to the Access Gateway (AGW) 15 by communication link 11. The AGW 15 controls packet transmission to and from the RAN 10. The AGW 15 is coupled to a Proxy Call Session Control Function (P-CSCF) 25 by communication link 20. The P-CSCF 25 is also known as a SIP proxy server. The P-CSCF 25 is linked by communication link 33 to the Serving Call Session Control Function (S-CSCF) 35.

The P-CSCF 25 provides a point of contact for the MS 5, and all information packets transmitted to or from the MS 5 are routed through the P-CSCF 25 and the S-CSCF 35. Both the P-CSCF 25 and the S-CSCF 35 are network routers and may reside on the same or different networks. If the two SIP servers are on different networks, then the MS 5 is connected to a visited network with the S-CSCF 35 residing on the MS's 5 home network and the P-CSCF 25 residing on the visited network. Link 33 could be over the Internet in that situation where the S-CSCF 35 and the P-CSCF 25 reside on different networks.

In terms of the SIP protocol, the P-CSCF 25 is a SIP outbound proxy node controlling call connection to the S-CSCF 35 from the MS 5, and the S-CSCF 35 is a SIP outbound serving node controlling call connections to the P-CSCF 25 and the communication device communicating with the MS 5. The P-CSCF 25 and S-CSCF 35 are the signaling entities for call session control, managing the SIP session, coordinating with other network elements for session control, service control, and resource allocation. Both P-CSCF 25 and the S-CSCF 35 are responsible for managing allocation of system resources, maintaining knowledge of system states, querying AAA servers for authentication, and performing session processing tasks, such as routing information packets.

Figure 2:
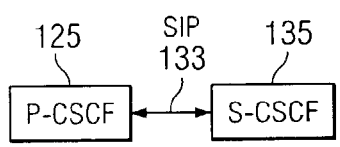
FIG. 2 shows the entities in the 3GPP2 communication system using SIP.

FIG. 2 shows the SIP nodes in the 3GPP2 system of FIG. 1. The P-CSCF 125 and S-CSCF 135 are SIP nodes transmitting SIP control messages for applicable SIP protocol applications initiating and supporting a multimedia communication session. Two-way communication link 135 couples the P-CSCF 125 to the S-CSCF 135. For services rendered to a MS 5 on a visited network, the P-CSCF 125 is an outbound proxy SIP server and is the MS's 5 point of contact with the visited network after registration for routing information packets. The S-PCSF 135 is a serving SIP server on the home network responsible for identifying the entity's service privileges, selecting access to the home network application server, and providing access to the application server. These SIP servers provide call control functions including both setup and tear down for a communication session. The S-CSCF 135 also interfaces with the AAA server on the home network facilitating AAA functions.

If the P-CSCF 125 and S-CSCF 135 are on different networks, then the link 133 can be over an Internet connection. The SIP nodes can also reside on the same network, and SIP nodes on the same network may occupy the same equipment location or reside in widely separate locations. It is even possible for the two SIP servers to reside hundreds of miles apart with other communication infrastructure (e.g. wiring, routers, etc) comprising the link 133.

Figure 3:
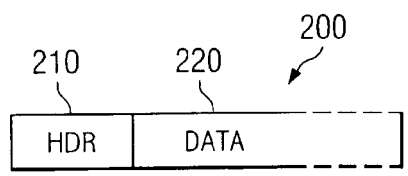
FIG. 3 is a representation of an information packet used in IP-based communication systems.

The general format of an information packet used on packet-based Internet Protocol (IP) communication systems is shown in FIG. 3. Information packets use an encoding format of "1" and "0" data bits to build a data stream that a computer can interpret. The information packet 200 has an IP address header 210 that provides routing instructions for transport over an IP communication system. The actual length and configuration of the IP header 210 is dependent on the actual communication protocol being used in a given network's protocol implementation (e.g. IPv4 or IPv6). The information packet 200 also contains a variable length data field 220 that contains the actual information being transmitted from the originating source to the destination source.

Figure 4:
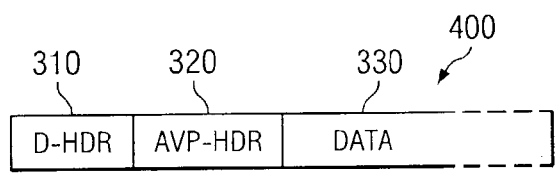
FIG. 4 the general format for a DIAMETER message information packet.

The general format of a DIAMETER message information packet usable in the invention is shown in FIG. 4. The DIAMETER message information packet 300 contains a DIAMETER Header (D-HDR) 310 that comprises routing addressing over the networks. The AVP Header (AVP-HDR) 320 identifies the attribute code data uniquely and specifies the length of the AVP (e.g. the AVP header and AVP data). The Data field (DATA) 330 contains data information communicated in the DIAMETER message.

Figure 5:
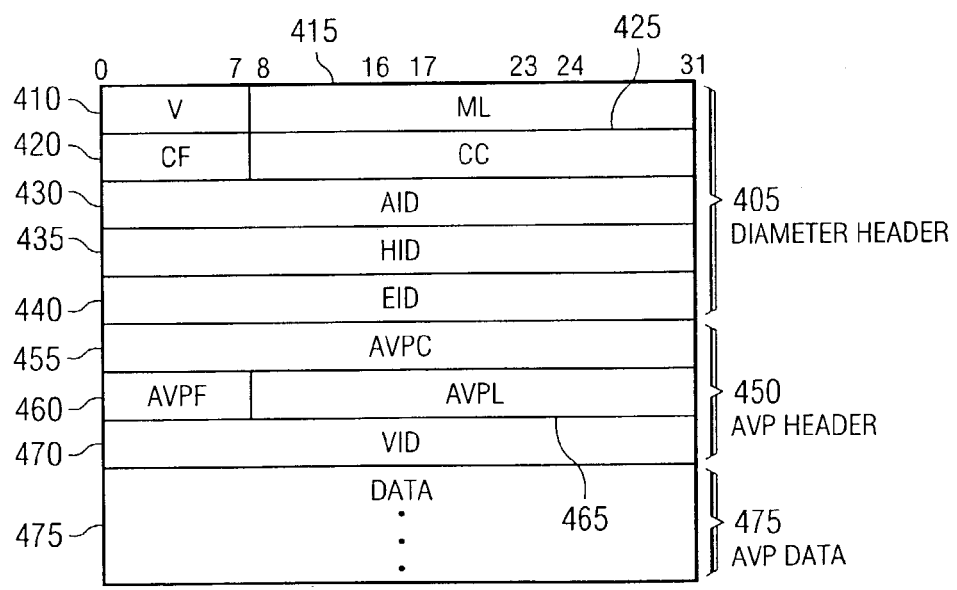
FIG. 5 is the format for a DAMETER message information packet compatible for use in the invention.

FIG. 5 shows the details of a DIAMETER message compatible with the invention. The DIAMETER Header contains seven data fields. The Version (V) data field 410 is 8 bits long and indicates the version of the DIAMETER protocol of the information packet. The Message Length (ML) data field 415 is 24 bits long and indicates the overall length of the DIAMETER message including the header fields. The Command Flag (CF) data field 420 is 8 bits long and includes flag bits for whether the message is a request or an answer, whether the message may be proxied, whether the message contains a protocol error, or whether the message is potentially retransmitted. The Command-Code (CC) data field 425 is 24 bits long and communicates the command associated with the message. The Application-ID (AID) data field 430 is 32 bits long and identifies to which application the message applies, which can include authentication, accounting, or in this case a vendor-specific application. The Hop-by-Hop Identifier (HID) data field 435 is a 32 bit field for matching requests and replies. The End-to-End Identifier (EID) data field 440 is used to detect duplicate messages.

The AVP Header 450 contains four data fields. The AVP Code (AVPC) data field 455 is 32 bits long. When combined with the Vendor-ID (VID) data field 470, the AVP attribute is uniquely identified. This field contains the AVP codes for releasing resources and acknowledging the release. The AVP Flag (AVPF) data field 460 informs the receiver how each attribute must be handled. The 'P' bit flag indicates need for encryption for end-to-end security. The 'M', or mandatory, bit flag indicates whether support of the AVP is required. If an AVP message is receive with the M-bit set by a DIAMETER client, server, proxy, or translation agent and the AVP is unrecognized, the message must be rejected. In the invention, the M-bit is not set and the message may be rejected or ignored. The 'V' bit indicates whether the AVP code is vendor-specific. In the invention, the V-bit is set, indicating a vendor-specific AVP code.

The AVP Length (AVPL) data field 465 is 24 bits long and indicates the length of the AVP information packet (e.g. the AVPC 455, the AVPF 460, the AVPL 465, the VID 470, and the DATA 475). The Vendor-ID (VID) data field 470 is 32 bits long and only present if the V-bit flag is set, and the VID 470 contains the assigned identifier for the vendor. Since the V-bit is set in the invention, a vendor identifier is present. The Data (DATA) data field 475 is variable in length and may not be present. The format and length of the DATA 475 field is determined by the AVPC 455 and AVPL 465 data fields.

Figure 6:
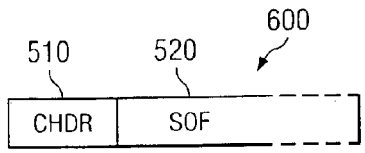
FIG. 6 is the general format for a COPS message information packet.

FIG. 6 shows the general format for a COPS message information packet. The COPS message information packet 600 contains a COPS Header (CHDR) 510 that is 64 bits long and a variable length Specific Object Formats (SOF) data field 520.

Figure 7:
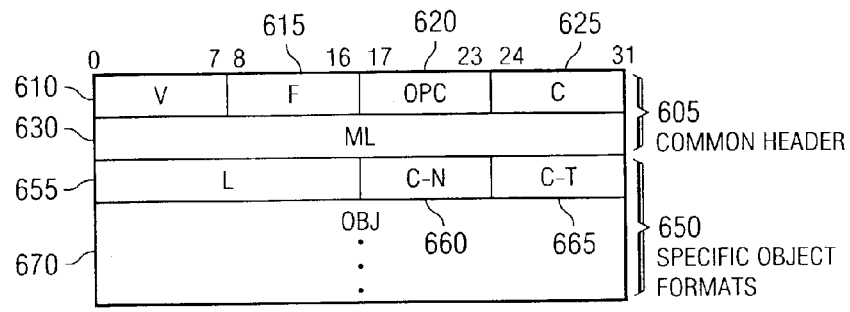
FIG. 7 is the format for a COPS message information packet compatible for use in the invention.

FIG. 7 shows details of a COPS message information packet compatible with the invention. The COPS Version data field (V) is 4 bits long and indicates the version of COPS used for the message. The Flag (F) data field 615 is 4 bits long and is set when the message is solicited by another COPS message. The Client-type (C) data field 625 is 16 bits long and identifies the policy client. The Message Length (ML) data field 630 is 32 bits long and indicates the length of the message in octets (8 bits equals 1 octet) and includes the COPS header and all encapsulated objects.

The Specific Object Formats data fields 650 include four data fields. The Length (L) data field 655 is a 16-bit value designating the number of octets composing the object. The C-Num (C-N) data field 660 is an 8-bit data field identifying the class of information contained in the object. The C-type data field (C-T) 665 is an 8-bit data field identifying the subtype or version of the information contained in the object. The Object (OBJ) data field is a variable length data field containing the communicated policy.

Figure 8:
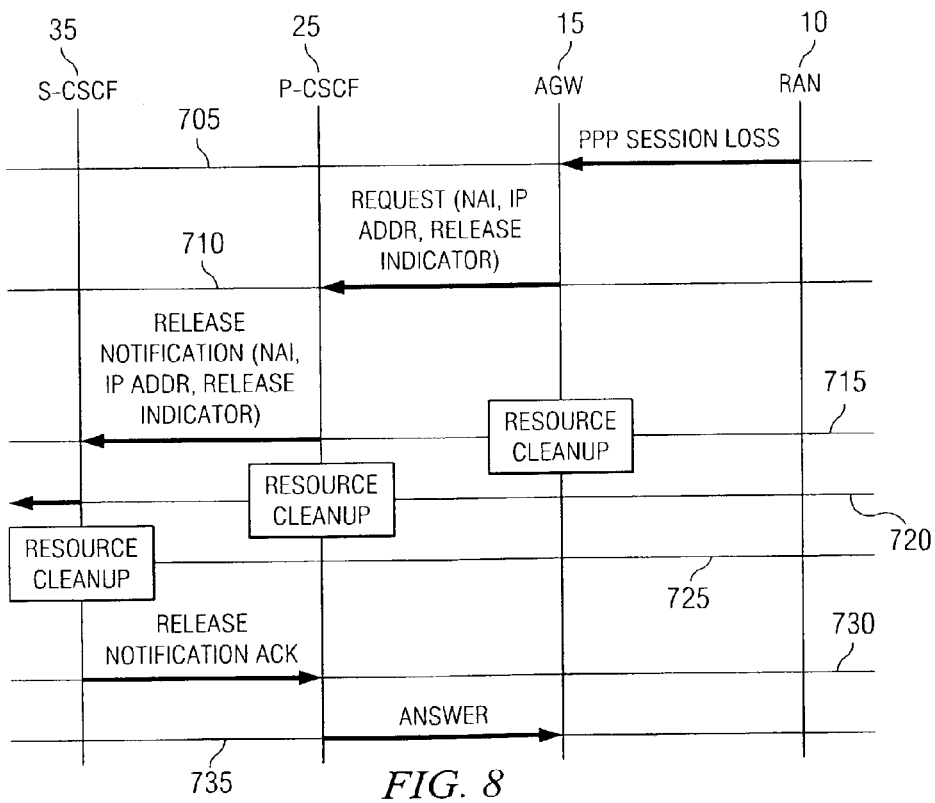
FIG. 8 is the message sequence under the invention communicating session loss and release of network resources.

FIG. 8 is the new message sequence used in the invention. In step 705, the RAN 10 detects disruption of a communication session and transmits a Point-to-Point Protocol (PPP) Session Loss message to the AGW 15. In step 710, the AGW 15 in turn transmits a Request message containing a data indicator for loss of session and a resource release indicator to the Proxy SIP Server (e.g. the P-CSCF 25). This Request message can be a DIAMETER, DIAMETER-like, COPS protocol message, or some other similar request/response message protocol.

In step 715, the AGW 15 executes resource cleanup procedures releasing network resources used in the terminated communication session, and the Proxy SIP Server transmits a Release Notification message to the Serving SIP Server (e.g. the S-CSCF 35). In step 720, the Serving SIP Server transmits any required notification messages to other network entities, and the Proxy SIP Server executes resource cleanup procedures releasing resources used in the terminated communication session. In step 725, the Proxy SIP Server executes resource cleanup procedures releasing resources used in the terminated communication session.

In step 730, the Serving SIP Server transmits a Release Notification Acknowledge message to the Proxy SIP Server confirming receipt of the Release Notification message and resource release. In step 735, the Proxy SIP Server transmits an Answer message to the AGW 15 acknowledging receipt of the Request message and confirming resource release of network resources. This Answer message in step 735 can constitute the final message of the new protocol of the invention, but other messages can be transmitted as part of the clean-up routine.

The message formats used in the invention can be a DIAMETER, DIAMETER-like, or COPS protocol message, but any similar request/response message protocol can be adapted as the messages used in the message sequence to communicate the loss of communication and initiate release of network resources supporting the disrupted communication. The Request, Answer, Release Notification, and Release Notification Acknowledge messages used in the protocol will follow the same basic configuration. For a DIAMETER or DIAMETER-like message protocol, specific AVP codes for the Request, Answer, Release Notification, and Release Notification Acknowledge are defined and implemented on the network as described in FIG. 5. For a COPS message, the C-Num, C-type, and Object codes are defined and implemented for the Request, Answer, Release Notification, and Release Notification Acknowledge policy messages on the network as described in FIG. 7.

While the invention has been particularly shown and described with respect to preferred embodiments, it will be readily understood that minor changes in the details of the invention may be made without departing from the spirit of the invention.

Having described the invention, we claim:

1. A packet-based wireless communication system, comprising:
    a session initiation proxy server linked to a wireless mobile station, wherein the proxy server supports transmission of information packets to the mobile station;
    a session initiation serving server coupled to the proxy server supporting transmission of information packets to the mobile station;
    a release notification message transmitted from the session initiation proxy server to the session initiation serving server to implement release of communication system resources supporting a disrupted communication to the mobile station; and
    said session initiation proxy server releases communication system resources supporting the disrupted communication to the mobile station in response to receipt of a release request message.

2. The packet-based wireless communication system of claim 1 wherein the session initiation proxy and serving server are session initiation protocol servers implementing a session initiation protocol on the communication system.

3. The packet-based wireless communication system of claim 1 wherein the release notification message is transmitted in response to a release request message transmitted from an access gateway coupled to the session initiation proxy server upon disruption of communication to the mobile station.

4. The packet-based wireless communication system of claim 1 wherein the session initiation serving server transmits a release notification acknowledgement message to the session initiation proxy server after release of communication system resources.

5. The packet-based wireless communication system of claim 4 wherein the session initiation proxy server transmits an answer message after receipt of the release notification acknowledgement message.

6. A method of releasing communication network resources in a wireless communication network comprising the steps of:
   providing a session initiation proxy server coupled to a session initiation serving server, each supporting information packet transmission over a wireless communication link to a mobile station;
   receiving a release notification message at the session initiation serving server requesting the release of communication system resources supporting a disrupted communication to the mobile station; and
   releasing communication system resources supporting the disrupted communication to the mobile station in response to receipt of a release request message.

7. The method of releasing communication network resources in a wireless communication network of claim 6 wherein the proxy server and serving server are session initiation protocol servers each operating the session initiation protocol.

8. The method of releasing communication network resources in a wireless communication network of claim 6 further comprising the steps of:
   coupling the session initiation proxy server to an access gateway coupled to the mobile station;
   transmitting a release request information packet from the access gateway to the session initiation proxy server;
   transmitting a release notification information packet from the session initiation proxy server to the session initiation serving server; and
   releasing network resources supporting communication to the mobile station in response to receipt of the release notification information packet.

9. The method of releasing communication network resources in a wireless communication network of claim 6 further comprising the step of transmitting an information packet from the access gateway to the session initiation proxy server initiating the release of communication network resources when communication to the mobile station is disrupted.

10. The method of releasing communication network resources in a wireless communication network of claim 9 wherein the information packet contains an indicator of disrupted communication to the mobile station.

11. The method of releasing communication network resources in a wireless communication network of claim 6 further comprising the steps of:
   receiving a release notification information packet at the serving server; and
   releasing network resources supporting communication to the mobile station in response to the release notification information packet.

12. The method of releasing communication network resources in a wireless communication network of claim 6 further comprising the steps of:
   receiving a release notification information packet at the serving server; and
   releasing network resources supporting communication to the mobile station in response to the release notification information packet.

13. The method of releasing communication network resources in a wireless communication network of claim 6 further comprising the steps of:
   transmitting a release notification acknowledgment from the session initiation serving server to the session initiation proxy server after release of communication system resources; and
   transmitting an answer message from the session initiation proxy server after receipt of the release notification acknowledgment message.

14. A method of releasing communication network resources in a wireless communication network connected to a mobile station comprising the steps of:
   providing a session initiation proxy server coupled to a session initiation serving server, each supporting information packet transmissions over a wireless communication link to a mobile station;
   providing an access gateway coupled to a radio access network providing communication to the mobile station;
   coupling the access gateway to the proxy session initiation server;
   transmitting a first information packet from said access gateway to the proxy session initiation server upon receipt of a session loss notification message for a disrupted communication; and
   receiving said first information packet at the proxy session initiation server to initiate release of said communication network resources supporting the disrupted communication.

15. The method of releasing communication network resources in a wireless communication network connected to a mobile station of claim 14 wherein said first information packet is transmitted when a communication session with said mobile station is disrupted.

16. The method of releasing communication network resources in a wireless communication network connected to a mobile station of claim 14 further comprising the steps of:
   transmitting a second information packet from the session initiation proxy server to the session initiation serving server upon receipt of the first information packet; and
   releasing network resources supporting communication to said mobile station upon receipt of the second information packet.

17. The method of releasing communication network resources in a wireless communication network connected to a mobile station of claim 14 further comprising the step of transmitting a release notification acknowledgment from the session initiation serving server to the session initiation proxy server after release of communication system resources.

18. The method of releasing communication network resources in a wireless communication network connected to a mobile station of claim 14 further comprising the step of
   transmitting an answer message from the session initiation proxy server after receipt of the release notification acknowledgment message.

19. The method of releasing communication network resources in a wireless communication network connected to a mobile station of claim 14 further comprising the steps of:
   transmitting a release notification acknowledgment from the session initiation serving server to the session initiation proxy server after release of communication system resources; and transmitting an answer message from the proxy session initiation server after receipt of the release notification acknowledgment message.

20. The method of releasing communication network resources in a wireless communication network connected to a mobile station of claim 14 wherein the first information packet has a request message format for release of communication network resources.

* * * * *